(12) United States Patent
Tseng

(10) Patent No.: US 8,480,277 B2
(45) Date of Patent: Jul. 9, 2013

(54) LED ILLUMINATION DEVICE

(76) Inventor: Shen-Ko Tseng, Taipei (TW)

( * ) Notice: Subject to any disclaimer, the term of this patent is extended or adjusted under 35 U.S.C. 154(b) by 319 days.

(21) Appl. No.: 13/009,064

(22) Filed: Jan. 19, 2011

(65) Prior Publication Data
US 2012/0087144 A1    Apr. 12, 2012

(30) Foreign Application Priority Data
Oct. 8, 2010    (CN) ...................... 2010 2 0552054 U

(51) Int. Cl.
*F21V 7/04*    (2006.01)
(52) U.S. Cl.
USPC .......................................... 362/555; 362/605
(58) Field of Classification Search
USPC .................. 362/605, 612, 555, 565, 577, 103
See application file for complete search history.

(56) References Cited

U.S. PATENT DOCUMENTS 7,290,906 B2 * 11/2007 Suzuki et al. ................. 362/511
2011/0273751 A1 * 11/2011 Wilsher ........................ 358/475

* cited by examiner

*Primary Examiner* — David V Bruce

(57) ABSTRACT

The invention discloses a LED illumination device comprising a LED light source and a light guide device. The LED light source provides a light. The light guide device comprises a light-receiving surface, a light-emitting surface, and a body. The light-receiving surface receives the light from the light source. The body has a light channel for guiding the light toward the light-emitting surface. In addition, the body comprises at least one light splitter, and a part of the light within the light channel penetrates the body through the light splitter. Specially, the light guide device with the light splitter can reduce the amount of light emitting devices. The illumination system can be conspicuous at night.

13 Claims, 5 Drawing Sheets

LED ILLUMINATION DEVICE

BACKGROUND OF THE INVENTION

1. Field of the Invention

The invention is related to a LED illumination device. More particularly, the invention is related to the LED illumination device which can guide the light by a light guide device comprising at least one light splitter.

2. Description of the Prior Art

When the pedestrians walk at night, traffic accidents will happen easily if the lighting of the surrounding is weak. Thus, the pedestrians need to wear some accessories which easily reflect the light or self-lighting to increase the recognition in the night. The self-lighting accessories of the prior art can be an illumination device which has a light emitting diode. However, to make the pedestrians to be noticed easily, the area of the light-emitting cannot be too small. That is to say, the illumination device needs to be equipped with a lot of light emitting diodes, even light emitting diode array, to be conspicuous. For example, when the prior art of the illumination device is disposed on the shoes, a lot of light emitting diodes should be disposed on the shoes for letting the pedestrians be noticed. However, when a lot of light emitting diodes are disposed on the shoes, not only the power consumption is increased, but the arrangements of the circuits become cumbersome. In addition, the function of the water-proof and the durability should be considered.

On the other hand, the prior art of the light emitting diode of the illumination device can be a twinkle band to achieve the functions as previously said. Please refer to FIG. 1, FIG. 1 illustrates a schematic diagram of a twinkle band according to one embodiment of the prior art. As shown in FIG. 1, the twinkle band 9 comprises a controlling box 90 and a plurality of the light emitting diodes 92. The controlling box 90 is electronically connected to the light emitting diodes 92 by the power lines 94 and controls the light emitting diodes 92 to emit the light. In details, the controlling box 90 can have a battery and a control element. The battery can provide the power for the plurality of the light emitting diodes 92 by the power lines 94. The control element can adjust the light-emitting frequency of the light emitting diodes 92.

However, to be noticed by the pedestrians and cars, the twinkle band 9 needs a lot of the light emitting diodes 92. The power consumption is increased accordingly. Additionally, due to the large number of the light emitting diodes 92 and the purpose for extending the life of the twinkle band 9, there will be a lot of problems about the arrangement and the replacement of the power lines 94.

To sum up, how to reduce the number of the illumination element of the illumination device and achieve the adequate effect of the recognition are the main objectives in the field of the invention. Furthermore, the internal structure of the illumination device should be an easy and non-high specification water-proof suite to be equipped for the pedestrians and enhance the traffic safety. Therefore, the illumination device is highly practical and researched by the companies.

SUMMARY OF THE INVENTION

Accordingly, one aspect of the invention is to provide a LED illumination device. By using a light guide device, a light can be guided effectively for decreasing the number of the illumination elements. In addition, at least one light splitter is disposed on the light guide device for letting the light penetrate the light guide device. Meanwhile, the LED illumination device can be conspicuous.

The invention discloses a LED illumination device, and the device comprises a LED light source and a light guide device. The LED light source provides a light. The light guide device receives the light by a light-receiving surface. Inside the body has a light channel for guiding the light toward the light-emitting surface. In addition, the light-receiving surface is parallel to the light-emitting surface. The body comprises at least one light splitter and the part of the light within the light channel penetrates the body through the light splitter before the light-emitting surface received the light.

In one embodiment, the light splitter can comprise a notch. A part of the light within the light channel penetrates the body through a tangential plane of the notch. In addition, the light splitter can comprise a hole. The hole penetrates the body and the part of the light within the light channel penetrates the body through a tangential plane of the hole. The stretching directions between the hole and the light channel form an angle. The light splitter is a pattern and the part of the light within the light channel penetrates the body through a tangential plane of the pattern.

In another embodiment, the LED illumination device of the invention further comprises a heat shrinkable sleeve. The heat shrinkable sleeve is fixed the LED light source to the light guide device. In addition, the light guide device comprises a slot for accommodating the LED light source. The LED illumination device further comprises a sticking device for fixing the LED light source to the slot of the light guide device. Furthermore, the LED light source comprises an active thread and the slot has a passive thread. The active thread is corresponded to the passive thread for fixing the LED light source to the slot of the light guide device.

In another embodiment, the LED illumination device of the invention device further comprises a control element and a vibration sensing element. The control element is coupled to the LED light source for controlling the LED light source to produce a specific light-emitting pattern. The vibration sensing element is coupled to the control element for sensing a vibration produced by an external force and producing a triggering signal accordingly. The control element can control the LED light source according to the triggering signal. In addition, the light guide device can be disposed on an external surface of a shoe body and the light penetrates the light guide device toward the outside of the shoe body.

Accordingly, the LED illumination device of the invention can guide the light effectively by using a light guide device for decreasing the number of the circuits of the LED illumination device and enhancing the durability relatively. In addition, at least one light splitter is disposed on the light guide device for letting the light penetrate the light guide device. Meanwhile, the LED illumination device can be conspicuous.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

Figure 1:
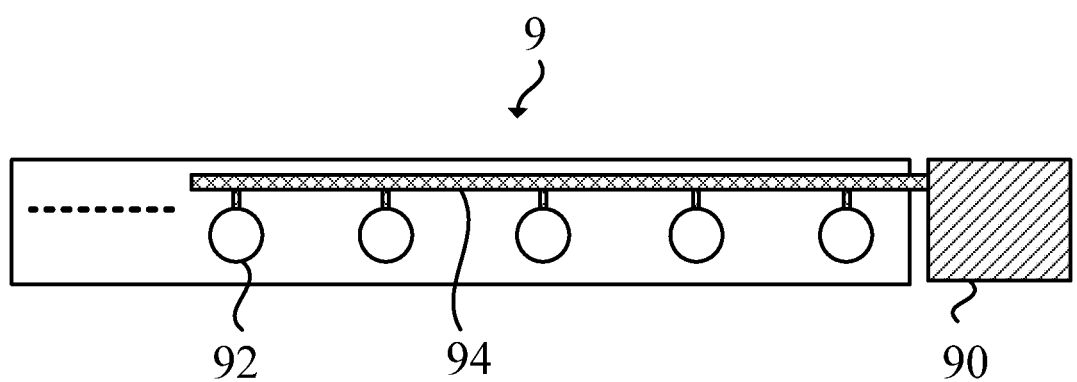
FIG. 1 is a schematic diagram of a twinkle band according to one embodiment of the prior art.
Figure 2:
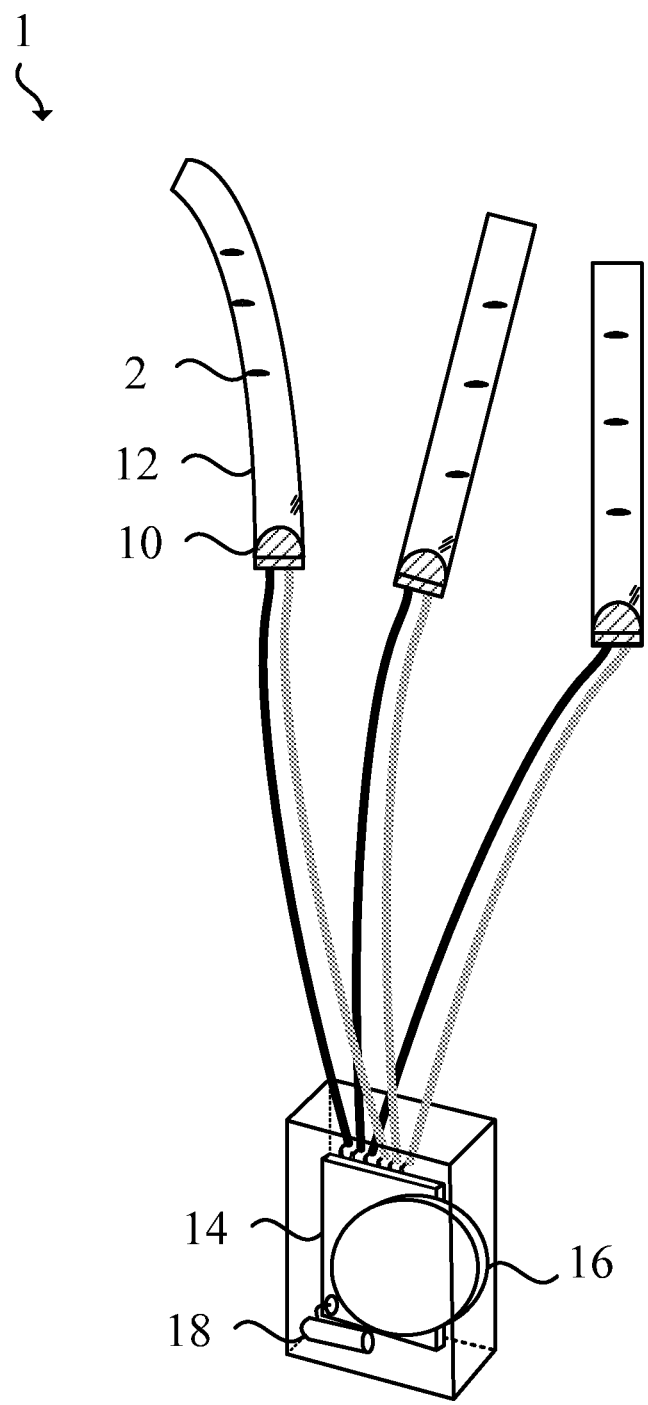
FIG. 2 is a 3D diagram of a LED illumination device according to one embodiment of the invention.
Figure 3A:
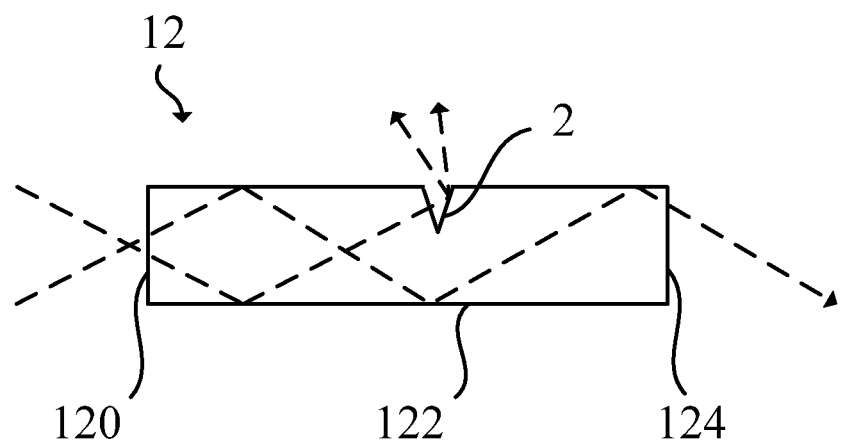
FIG. 3A is a schematic diagram of a light guide device according to one embodiment of the invention.
Figure 3B:
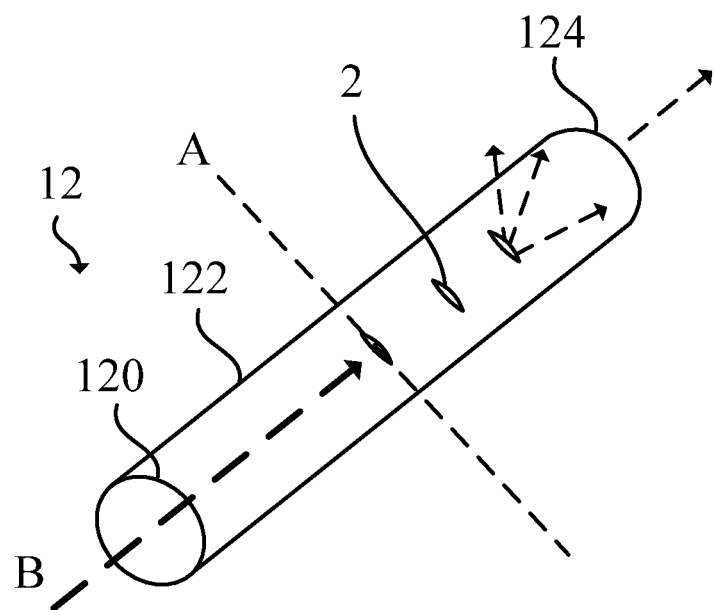
FIG. 3B is a 3D diagram of the light guide device according to one embodiment of the invention.

Please refer to FIG. 2, FIG. 3A and FIG. 3B. FIG. 2 is a 3D diagram of a LED illumination device according to one embodiment of the invention. FIG. 3A is a schematic diagram of a light guide device according to one embodiment of the invention. FIG. 3B is a 3D diagram of the light guide device according to one embodiment of the invention. The LED illumination device 1 of the invention comprises a LED light source 10, a light guide device 12, a control element 14, a vibration sensing element 16 and a battery 18. In addition, the LED light source 10, the light guide device 12, the control element 14, the vibration sensing element 16 and the battery 18 can be integrated in a shell which is used to package. The LED light source 10 can be drawn to a suitable place from the shell according to the need of the user. The battery 18 provides the electrical power to the LED illumination device 1. The detailed description of the elements and the functions are illustrated in following text.

The LED light source 10 is used to provide the light. In practice, the LED illumination device 1 comprises a plurality of the LED light sources 10. Each LED light source 10 can be a LED module and the LED light source 10 comprises a plurality of LED chips which are used to convert the electric power into the optical energy. In addition, the light guide device 12 comprises a light-receiving surface 120, a body 122 and a light-emitting surface 124. The light-receiving surface 120 is connected to the LED light source 10 for receiving the light. The body 122 has a light channel inside for guiding the light toward the light-emitting surface 124. The body 122 comprises at least one light splitter 2 and a part of the light within the light channel penetrates the body 122 through the light splitter. The control element 14 is coupled to the LED light source 10 for controlling the LED light source 10 to produce a specific light-emitting pattern. In practice, each LED light source 10 can be connected and controlled by the control element 14. Furthermore, the control element 14 can control the light source 10 to output the optical patterns, twinkle, change the color or change the status of the switch, for outputting the specific light-emitting pattern. Additionally, the vibration sensing element 16 is coupled to the LED light source 10 for sensing a vibration produced by an external force and producing a triggering signal accordingly. In practice, the vibration sensing element 16 can comprises an acceleration detector. If the acceleration of the vibration sensing element 16 exceeds a threshold, the vibration sensing element 16 will produce the triggering signal for letting the control element 14 control the plurality of the LED light sources 10 to twinkle, change the color or change the switch.

In details, please refer to FIG. 3A and FIG. 3B, the light guide device 12 can be a flexible light guide channel, such as a plastic optical fiber. The two end surfaces are corresponded to the light-receiving surface 120 and the light-emitting surface 124. The body 122 can be a cylindrical structure. The surface of the body 122 can be a cylindrical surface. The light splitter 2 is disposed on the cylindrical surface of the light guide channel. The flexible light guide channel can show a one-dimensional light-emitting effect in visual. The user can couple the light-receiving surface 120 of the light guide device 12 to the LED light source 10 for guiding the light emitted from the LED light source 10 toward the light-receiving surface 120.

In addition, the light guide device 12 further comprises a slot for accommodating the LED light source 10. To accommodate the LED light source 10 steadily, the LED illumination device 1 can comprise a sticking device for fixing the LED light source to the slot of the light guide device 12. In addition, the LED light source 10 can comprise an active thread and a slot comprising a passive thread. The active thread is corresponded to the passive thread for fixing the LED light source 10 to the slot of the light guide device 12. Furthermore, the light guide device 12 and the LED light source 10 can be covered by a heat shrinkable sleeve so that the LED light source 10 is coupled to the light guide device 12. In practice, the slot can be disposed on the light-receiving surface 120. The LED light source 10 is disposed in the related slot and stuck with the light guide device 12 by adhesive for letting the light-receiving surface 120 can receive the light from the LED light source 10.

In the invention, the light-receiving surface 120 can be integrated an optical waveguide for letting the LED light source 10 be received completely by the light guide device 12. In addition, the body 122 has a light channel which can let the light fully reflect and guide the light toward the light-emitting surface 124. The body 122 comprises at least one light splitter 2, wherein the light splitter 2 comprises a notch or a hole for letting the part of the light within the light channel penetrate the body 122 through the tangential plane of the notch or the hole. The notch means that the light splitter 2 dose not penetrate the body 122, the hole means that the light splitter 2 penetrates the body 122.

However, the light splitter 2 can be, but not limited to a notch or a hole. A person who has common knowledge in the field of the invention can change the light splitter 2 according to the situation. Specially, if the light channel is changed, the light can still penetrate the light guide device 12 through a tangential plane. The situations are all belong to the scope of the invention of the light splitter 2. For example, light splitter 2 can be a cutting kerf for letting the light penetrate the tangential plane of the cutting kerf. According to the first preferred embodiment, as the illustration of FIG. 3B, the stretching direction A of the light splitter 2 and the stretching direction B of the light channel are formed an angle, so that the light-receiving surface of the light splitter 2 becomes lager within the light channel. Accordingly, LED illumination device 1 can be conspicuous.

To be noticed, the light guide device 12 can comprise lots of the light splitters 2. Each stretching direction of the light splitter 2 can be different so that the identification function of the each angle can be enhanced.

Figure 4:
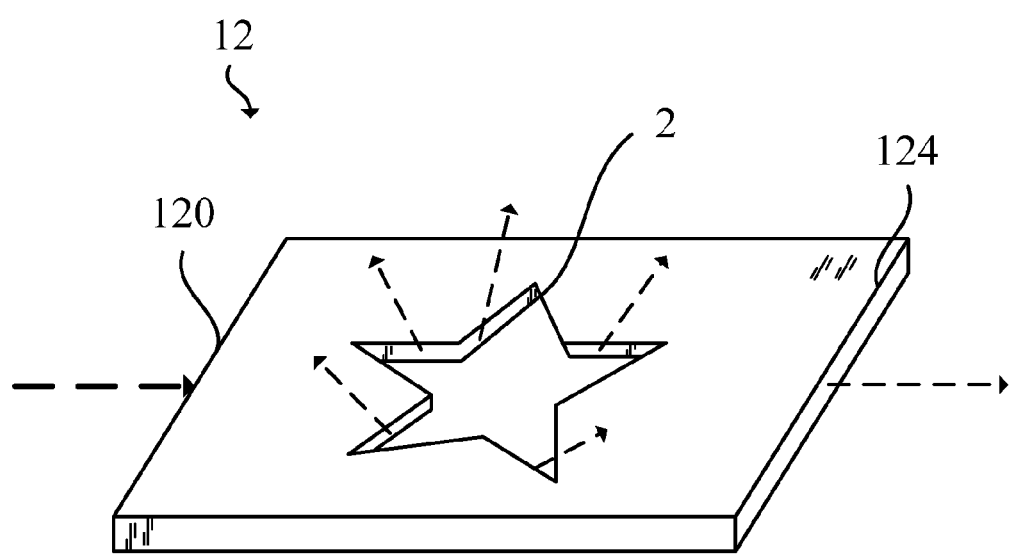
FIG. 4 is a 3D diagram of the light guide device according to another embodiment of the invention.

In addition, FIG. 4 illustrates a 3D diagram of the light guide device according to another embodiment of the invention. As shown in FIG. 4, besides the notch or the hole, the light splitter 2 can further provide a pattern for letting the part of the light within the light channel penetrate the body through the light splitter. In practice, the light guide device 12 can be a lamellar light guide device. The lamellar light guide device can have two end surfaces, an upper surface and a lower surface. The two end surfaces are corresponded to the light-receiving surface 120 and the light-emitting surface 140. The light splitter 2 is disposed on the upper surface of the lamellar light guide device. In addition, the light splitter 2 can form a lot of 2D patterns, the 2D patterns stretch from the upper surface toward the lower surface of the lamellar light guide device and penetrate through the light guide device 12. That is to say, whether the 2D patterns penetrate the light guide device 12 or not, the light can penetrate along the tangential plane of the 2D patterns to form a 2D light-emitting pattern in visual and achieve the effect of beauty. In the invention, the 2D pattern can be, but not limited to a notch or a hole. The 2D patterns which are used to change the light path within the light channel all belong to the scope of the light splitter 2.

The invention of the LED illumination device can be disposed to an accessory for pedestrian. Specially, the LED illumination device can be integrated with a shoe body. The light guide device can be disposed on or surrounded the external surface of the shoe body, so that the light penetrates the light guide device toward the outside of the shoe body. In practice, the LED illumination device further comprises a water-proof suite, wherein the LED light source is coupled to the water-proof suite for preventing the LED light source from water. For example, the LED light source, the control element, the vibration sensing element and the battery can be disposed in the shoe body or a suitable place and covered by the water-proof suite. The light guide device which has the light splitter can be surrounded with the shoe body for letting the light can penetrate through the each direction of the shoe body, so that the illumination system can be conspicuous at night.

Figure 5:
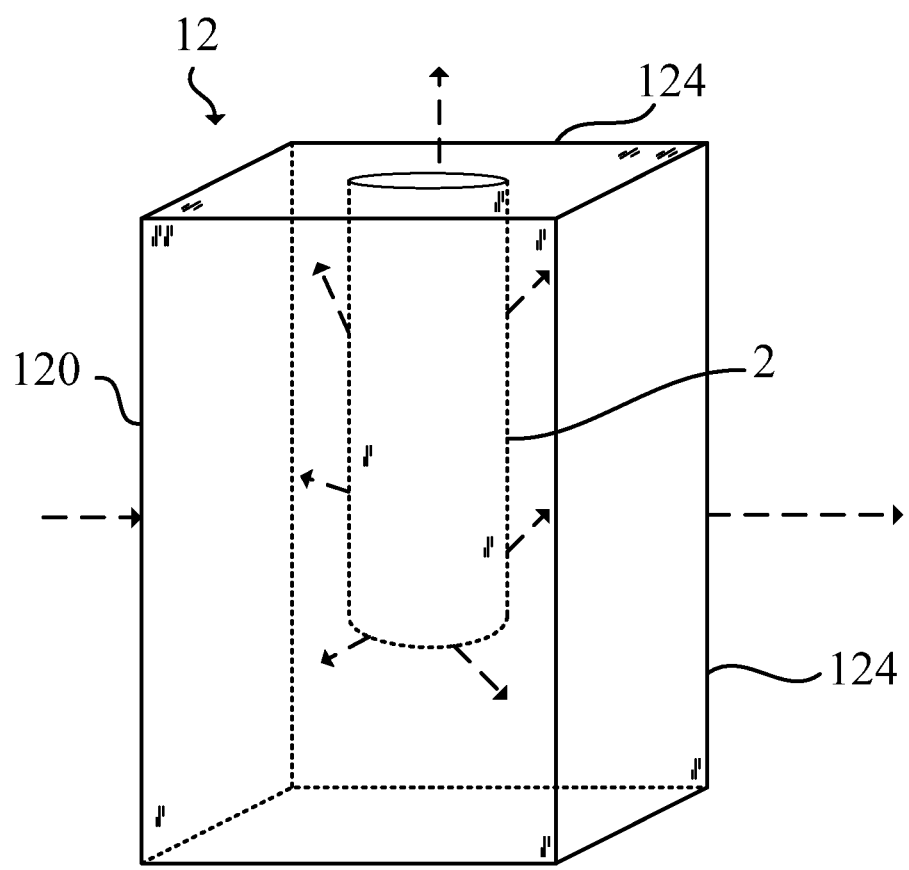
FIG. 5 is a 3D diagram of the light guide device according to another embodiment of the invention.

Additionally, the light guide device 12 can be a 3D light guide device. Please refer to FIG. 5. FIG. 5 illustrates a 3D diagram of the light guide device according to another embodiment of the invention. As shown in FIG. 5, the light guide device 12 further comprises a 3D light guide device. The 3D light guide device has two end surfaces, an upper surface and a lower surface. The two end surfaces are corresponded to the light-receiving surface 120 and the light-emitting surface 124. The light splitter 2 is disposed on the upper surface and stretches to the light guide channel 3D light guide device. In addition, the light splitter 2 can form a 3D pattern in the 3D light guide device for letting the light penetrate the body through the tangential plane of the 3D pattern. In practice, the light guide device 12 can be a light guide body with any arbitrary 3D type. The light can penetrate along the tangential plane of the 3D pattern to form a 3D light-emitting pattern in visual and achieve the effect of beauty.

To be noticed, it does not matter the light guide device 12 is the light guide channel, lamellar light guide device or the 3D light guide device. The light guide device 12 can fit the slot to accommodate the LED light source 10 and fix the LED light source 10 to the slot of the light guide device 12 by the sticking device. Otherwise, the LED light source 10 can comprise an active thread and the slot comprising a passive thread, so that the LED light source 10 can be fixed to the slot of the light guide device 12. Additionally, the light guide channel, the lamellar light guide device or the 3D light guide device also can be covered by the heat shrinkable sleeve with the LED light source 10, so that the LED light source 10 can be coupled to the light guide device 12. To sum up, by using a light guide device which comprises the light splitter, the LED illumination device of the invention can decrease the number of the illumination elements and guide the light effectively. Meanwhile, the illumination system can be conspicuous at night. Furthermore, because the number of the illumination elements are decreased, the circuits of the LED illumination device can be simplified and decreased, so that the durability of the LED illumination can be enhanced. The LED illumination device can suitable for easy and non-high specification water-proof suite so the LED illumination device can be surrounded with the shoes, umbrellas, or bags, to improve the safety for the pedestrian.

With the example and explanations above, the features and spirits of the invention will be hopefully well described. Those skilled in the art will readily observe that numerous modifications and alterations of the device may be made while retaining the teaching of the invention. Accordingly, the above disclosure should be construed a claims.

What is claimed is:

1. A LED illumination device, comprising:
    a light source for providing a light;
    a light guide device, comprising:
        a light-receiving surface, connected to the LED light source, for receiving the light;
        a light-emitting surface, the light-receiving surface parallel to the light-emitting surface;
        a body, the body having a light channel, for guiding the light from the light-receiving surface toward the light-emitting surface; wherein the body comprises at least one light splitter, and the part of the light within the light channel penetrates the body through the light splitter before the light-emitting surface received the light; and
    a heat shrinkable sleeve, wherein the heat shrinkable sleeve is fixed the LED light source to the light guide device.

2. The LED illumination device of claim 1, wherein the light splitter comprises a notch, and the part of the light within the light channel penetrates the body through the notch.

3. The LED illumination device of claim 1, wherein the light splitter comprises a hole, the hole penetrates the body and the part of the light within the light channel penetrates the body through a tangential plane of the hole.

4. The LED illumination device of claim 3, wherein the stretching directions between the hole and the light channel form an angle.

5. The LED illumination device of claim 1, wherein the light splitter is a pattern, and the part of the light within the light channel penetrates the body through a tangential plane of the pattern.

6. The LED illumination device of claim 1, further comprising:
    a control element, coupled to the LED light source, for controlling the LED light source to produce a specific light-emitting pattern; and
    a vibration sensing element, coupled to the control element, for sensing a vibration produced by an external force and producing a triggering signal accordingly, the control element controlling the LED light source according to the triggering signal.

7. The LED illumination device of claim 6, wherein the LED illumination device further comprises a battery for providing the energy to the LED light source, the control element and the vibration sensing element.

8. The LED illumination device of claim 1, wherein the light guide device is a lamellar light guide device, the lamellar light guide device has two end surfaces, an upper surface and a lower surface, the two end surfaces are corresponded to the light-receiving surface and the light-emitting surface, the light splitter is disposed on the upper surface of the lamellar light guide device.

9. The LED illumination device of claim 8, wherein the light splitter is a 2D pattern, the 2D pattern stretches from the upper surface toward the lower surface of the lamellar light guide device and penetrates through the light guide device.

10. The LED illumination device of claim 1, wherein the light guide device is a 3D light guide device, the 3D light guide device has two end surfaces, an upper surface and a lower surface, the two end surfaces are corresponded to the light-receiving surface and the light-emitting surface, the light splitter is disposed on the upper surface and stretches to the light guide channel 3D light guide device.

11. A LED illumination device, comprising:
    a light source for providing a light; and a light guide device, comprising:
- a light-receiving surface, connected to the LED light source, for receiving the light;
- a light-emitting surface, the light-receiving surface parallel to the light-emitting surface; and
- a body, the body having a light channel, for guiding the light from the light-receiving surface toward the light-emitting surface; wherein the body comprises at least one light splitter, and the part of the light within the light channel penetrates the body through the light splitter before the light-emitting surface received the light;
- wherein light guide device comprises a slot for accommodating the LED light source, the LED illumination device further comprises a sticking device for fixing the LED light source to the slot of the light guide device.

12. The LED illumination device of claim 11, wherein the light guide device is a light guide channel, the light guide channel has two end surfaces and a cylindrical surface, the two end surfaces are corresponded to the light-receiving surface and the light-emitting surface, the light splitter is disposed on the cylindrical surface of the light guide channel.

13. A LED illumination device, comprising:
a light source for providing a light; and
a light guide device, comprising:
- a light-receiving surface, connected to the LED light source, for receiving the light;
- a light-emitting surface, the light-receiving surface parallel to the light-emitting surface; and
- a body, the body having a light channel, for guiding the light from the light-receiving surface toward the light-emitting surface; wherein the body comprises at least one light splitter, and the part of the light within the light channel penetrates the body through the light splitter before the light-emitting surface received the light;
- wherein the light guide device comprises a slot for accommodating the LED light source, the LED illumination device further comprises an active thread and the slot has a passive thread, the active thread is corresponded to the passive thread for fixing the LED light source to the slot of the light guide device.

\* \* \* \* \*